(12) United States Patent
Cantin (10) Patent No.: US 8,799,587 B2
(45) Date of Patent: Aug. 5, 2014

(54) REGION COHERENCE ARRAY FOR A MULT-PROCESSOR SYSTEM HAVING SUBREGIONS AND SUBREGION PREFETCHING

(75) Inventor: Jason F. Cantin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 12/359,665

(22) Filed: Jan. 26, 2009

(65) Prior Publication Data

US 2010/0191921 A1  Jul. 29, 2010

(51) Int. Cl.
G06F 13/00 (2006.01)

(52) U.S. Cl.
USPC .................................. 711/146; 711/E12.026

(58) Field of Classification Search
None
See application file for complete search history.

(56) References Cited

U.S. PATENT DOCUMENTS

| | | | |
|---|---|---|---|
| 4,814,970 A | 3/1989 | Barbagelata et al. | |
| 5,963,978 A | 10/1999 | Feiste | |
| 6,209,067 B1 * | 3/2001 | Collins et al. | 711/158 |
| 6,449,700 B2 | 9/2002 | Hagersten et al. | |
| 6,751,698 B1 | 6/2004 | Deneroff et al. | |
| 6,938,128 B1 | 8/2005 | Kuskin et al. | |
| 7,152,191 B2 | 12/2006 | Kessler et al. | |
| 7,275,249 B1 | 9/2007 | Miller et al. | |
| 7,360,032 B2 | 4/2008 | Cantin et al. | |
| 2002/0049918 A1 | 4/2002 | Kaxiras et al. | |
| 2004/0117580 A1 * | 6/2004 | Wu et al. | 711/170 |
| 2004/0143712 A1 * | 7/2004 | Armstrong et al. | 711/152 |
| 2006/0179252 A1 | 8/2006 | Cantin et al. | |
| 2007/0022256 A1 | 1/2007 | Cantin et al. | |
| 2007/0255908 A1 * | 11/2007 | Zeffer et al. | 711/141 |
| 2008/0086602 A1 * | 4/2008 | Guthrie et al. | 711/144 |
| 2008/0155200 A1 | 6/2008 | Conway | |
| 2009/0106494 A1 | 4/2009 | Knebel | |
| 2009/0319726 A1 * | 12/2009 | Cantin et al. | 711/141 |
| 2010/0191914 A1 * | 7/2010 | Cantin | 711/122 |

FOREIGN PATENT DOCUMENTS

WO  WO 9912102  3/1999

OTHER PUBLICATIONS

Chen et al., Exploiting High-level Coherence Information to Optimize Distributed Shared State, PPoPP 2003, Jun. 11-13, 2003, pp. 131-142, San Diego, CA, ACM 2003.
Charles et al., X10: An Object-Oriented Approach to Non-Uniform Cluster Computing, OOPSLA 2005, Oct. 16-20, 2005, pp. 519-538, San Diego, CA, ACM 2005.
Cantin et al., "Coarse-Grain Coherence Tracking: Regionscout and Region Coherence Arrays", IEEE Micro, vol. 26, No. 1, pp. 70-79, Jan./Feb. 2006.
Cantin, "Coarse-Grain Coherence Tracking"Dissertation, University of Wisconsin at Madison, Jan. 2006.
Capello et al., MPI versus MPI+OpenMP on the IBM SP for the NAS Benchmarks, pp. 1-12, 2000 IEEE.
Bentley et al., Implicit Array Bounds Checking on 64-bit Architectures, ACM Transactions on Architecture and Code Optimization, vol. 3, No. 4, Dec. 2006, pp. 502-527, ACM, Inc., NY.

(Continued)

*Primary Examiner* — Sean D Rossiter
(74) *Attorney, Agent, or Firm* — Yudell Isidore Ng Russell PLLC; Diana Roberts (57) ABSTRACT

A Region Coherence Array (RCA) having subregions and subregion prefetching for shared-memory multiprocessor systems having a single-level, or a multi-level interconnect hierarchy architecture.

20 Claims, 5 Drawing Sheets

(56) References Cited

OTHER PUBLICATIONS

Kontothanassis et al., Shared Memory Computing on Clusters with Symmetric Multiprocessors and System Area Networks, ACM Transactions on Computer Systems, vol. 23, No. 3, Aug. 2005, pp. 301-335, ACM, Inc., NY.

Kumar et al., Interconnections in Multi-core Architectures: Understanding Mechanisms, Overheads and Scaling, Proceedings of the 32nd International Symposium on Computer Architecture (ISCA' 05) IEEE 2005.

U.S. Appl. No. 12/360,129, "Region Coherence Array Having Hint Bits for a Clustered Shared-Memory Multiprocessor System," Non-Final Office Action dated Sep. 12, 2011.

U.S. Appl. No. 12/144,759, "Efficient Region Coherence Protocol for Clustered Shared-Memory Multiprocessor Systems," Non-Final Office Action dated Feb. 11, 2011.

U.S. Appl. No. 12/144,759, "Efficient Region Coherence Protocol for Clustered Shared-Memory Multiprocessor Systems," Final Office Action dated Jul. 11, 2011.

Jason F. Cantin et al., Improving Multiprocessor Performance with Coarse-Grain Coherence Tracking, Proceedings of the 32nd Annual International Symposium on Computer Architecture, IEEE, 2005.

Martin Schulz et al., Owl: Next Generation System Monitoring, Proceedings of the 2nd conference on Computing Frontiers, pp. 116-124, 2005, Ischia, Italy.

* cited by examiner

REGION COHERENCE ARRAY FOR A MULT-PROCESSOR SYSTEM HAVING SUBREGIONS AND SUBREGION PREFETCHING

BACKGROUND OF THE INVENTION

1. Technical Field

The present invention relates in general to the field of computers, and in particular to shared-memory multiprocessors. More particularly, the present invention relates to a Region Coherence Array (RCA) for shared-memory multiprocessor systems having subregions and subregion prefetching.

2. Description of the Related Art

Processors in a single-level, or a multi-level interconnect hierarchy architecture are typically divided into groups called symmetric multiprocessing nodes (SMP nodes), such that processors within the same SMP node may share a physical cabinet, a printed circuit board, a multi-chip module, or an integrated circuit chip, thereby enabling low-latency, high-bandwidth communication between processors in the same SMP node.

Coarse-Grain Coherence Tracking (CGCT) using Region Coherence Arrays (RCAs) in shared-memory multiprocessor systems is a technique that has potential to optimize bandwidth, power consumption, and latency in shared-memory multiprocessor systems by identifying which level(s) of the interconnect hierarchy to which to send memory requests for a line of data, and sending memory requests only to those identified interconnect level(s), if any. If applicable, other levels of the interconnect hierarchy can be skipped without sending a memory request, thereby reducing memory request traffic and power-consumption at those interconnect levels, and avoiding the latency of checking those interconnect levels for a line of data stored among the processors in the system.

There are, however, two main perfomance-limiting aspects of CGCT using RCAs, which are reach and precision. That is, an RCA is limited by how much data it can map (reach), and how precisely it tracks the coherence status of lines not cached by a processor associated with the RCA (precision). To exploit more spatial locality and temporal locality, RCAs need to have more reach, and hence must utilize large region sizes. However, large region sizes can result in more false sharing of regions and less precise tracking of coherence status, such that sometimes lines in a region are shared when other lines in the region are not shared (region false sharing). Hence, to improve the performance of CGCT using RCAs, there is a need for RCAs which use large region sizes while tracking the coherence status of lines in the regions with increased precision.

Due to the fixed physical page size of the memory architecture, the region size has an effective upper bound. The operating system is not required to place related pages together in the system memory, thus increasing the region size beyond the physical page size is likely to be less effective, not more effective. Thus, the smallest physical page size supported by the system architecture enables the most reach and the most efficient utilization of data storage, and therefore is a practical choice. However, a smaller region size would increase precision and reduce false sharing, at the cost of spatial locality, temporal locality, and space efficiency. Therefore, what is needed to improve effectiveness in shared-memory multiprocessor systems is more precise tracking of coherence status while using a large region size.

SUMMARY OF THE INVENTION

Disclosed is a Region Coherence Array (RCA) including subregion information and prefetching, for shared-memory multiprocessor systems having a single-level, or a multi-level interconnect hierarchy architecture.

Described herein is an improved CGCT method which utilizes RCAs without sacrificing reach (i.e., how much data the RCA can map). Large regions, which include no more than a physical page of system memory, are divided into smaller subregions to track the coherence status of lines in the region with more precision. A subregion is a power-of-two fraction of the region size, is at least as large as a cache line, and is address-aligned with respect to the region. Each subregion has its own region coherence state and line-count. If presence bits are used in the RCA instead of line-counts to keep track of which lines from the region are cached, each subregion has its own set of presence bits.

To preserve spatial and temporal locality, entire regions are requested at once by prefetching the state of subregions adjacent to the subregion having the requested line. On external memory requests, processors check their respective associated RCA for the requested region to determine whether they are caching lines from the requested region. If a processor RCA indicates that one or more lines from the region is/are present, the RCA obtains the line-count for each subregion within the region. If the line-count from a subregion has a non-zero value, that infers that the subregion has lines cached by the processor.

A region snoop response is generated for each subregion of a region by, for example, OR-ing snoop responses from other processors for that subregion. The region snoop response for the requested subregion in the requested region is used, like a conventional region snoop response, to update the coherence state of the requested subregion. The region snoop response for the non-requested subregions in the requested region may nevertheless be used to upgrade their respective coherence state in anticipation of future processor requests to those currently non-requested subregions. This method of prefetching other subregions' coherence status (i.e., coherence state) may be referred to as "subregion prefetching".

Due to the smaller granularity of subregions, the tracking of coherence status within a subregion is more precise than that of tracking the status of a region. There is less false sharing of lines in subregions than in regions. Thus, the combination of a large region size and subregion prefetching ensures that tracking is more precise, while the same amount of spatial locality and temporal locality is effectively exploited.

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Reference will now be made in detail to the embodiments of the present invention, examples of which are illustrated in the accompanying drawings, wherein like reference numerals refer to the like elements throughout. The embodiments are described below in order to explain the present invention by referring to the figures. The specific reference numerals assigned to the elements are provided solely to aid in the description and not meant to imply any limitations (structural or functional) on the present invention.

The present invention provides a Region Coherence Array (RCA) having subregions and subregion prefetching for shared-memory multiprocessor systems having a single-level, or a multi-level interconnect hierarchy architecture.

Figure 1:
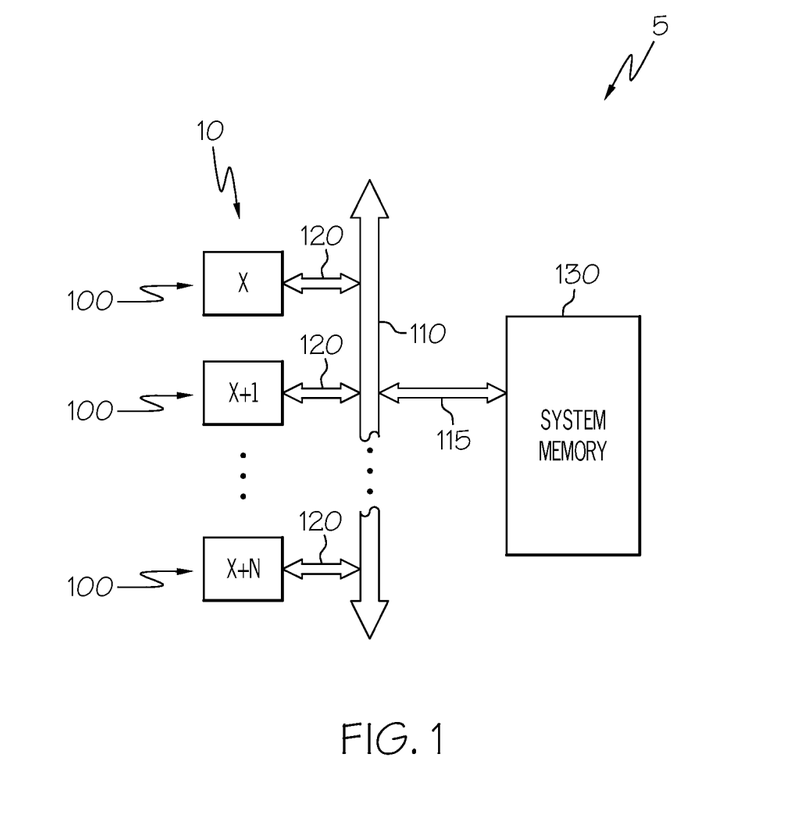
FIG. 1 depicts a high level block diagram of an embodiment of processors of an SMP node, according to an embodiment of the present invention.

Referring to FIG. 1, a high level block diagram of an embodiment of a plurality of processors $100_x \ldots 100_{x+n}$ in a multiprocessor shared-memory computer system 5, according to an embodiment of the present invention. Each of the plurality of processors $100_x \ldots 100_{x+n}$ communicates with each other, and with the system memory 130, via a system bus 110. Each of the processors $100_x \ldots 100_{x+n}$ communicates with the system bus 110 via a respective bus 120. The system memory 130 communicates with the system bus 110 via a bus 115. The processors $100_x \ldots 100_{x+n}$ form a Symmetric Multiprocessor (SMP) node 10. The system 5 includes a plurality of such SMP nodes 10, each of which is connected to each other and to the system memory 130.

Figure 2:
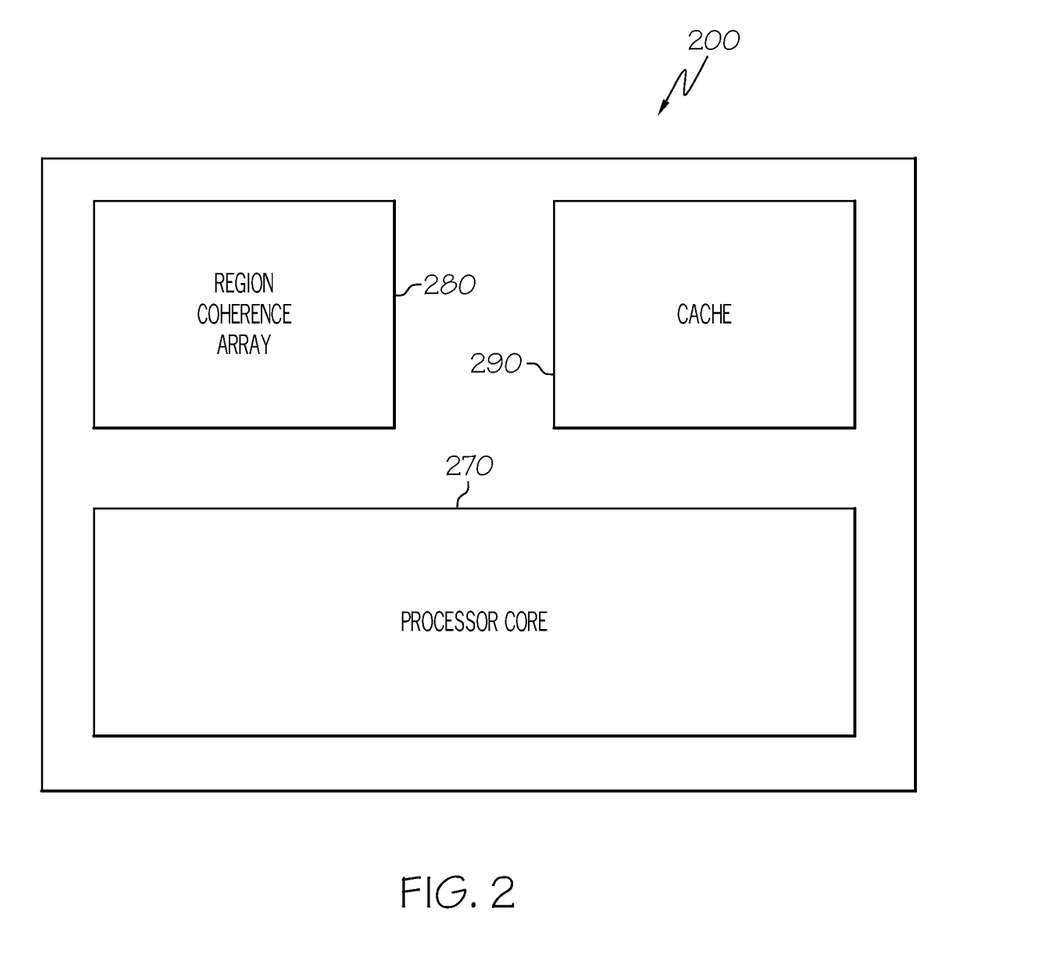
FIG. 2 depicts a high level block diagram of an embodiment of a processor of the SMP node of FIG. 1, according to an embodiment of the present invention.

Referring to FIG. 2, there is depicted an embodiment of a processor 200 which represents each of the plurality of processors $100_x \ldots 100_{x+n}$ of the shared-memory computer system 5 of the present invention. Processor 200 includes a processor core 270, a memory cache 290, and a Region Coherence Array (RCA) 280 associated with the cache 290.

In general, caches in such a system vary in size. For example, the cache 290 may include a plurality of lines of data which are each 64 bytes in size, where each line is from a region of a system memory 130 electronically connected to the processor 200, and may range in size from 128 bytes (2 lines of data) to 4 k bytes (1 physical page of the system memory 130, or 64 lines of data). In general, each cache 290 includes status of each line of data stored in the cache 290, and each RCA 280 includes status of each region of the system memory 130 from which the processor 200 associated with the cache 290 is caching lines of data.

The RCA 280 is an array of stored meta-data entries located in the cache hierarchy of processor 200, and is typically disposed near the lowest-level cache (for example, the L3 cache) of the processor 200 and is typically accessed in parallel with the lowest-level cache on processor requests and external snoops (described below in greater detail). The RCA 280 provides the status of a region and is tagged with an address of a defined region of the system memory 130. The RCA 280 is used to keep track of the status of the cache lines of each hierarchical level of cache associated with the processor core 270 by determining whether any lines within a region around a requested line have been previously cached by other processors 200, and if so, the location of where those lines have been cached within the system 5. The cache 290 may be, for example, a lowest-level cache of the processor 200 in a multi-level hierarchical cache system design, where the RCA 280 would, in such example, include entries to indicate the status of all the lines in the L3 cache 290.

As described above, the shared-memory computer system which includes processor 200 may be designed such that cache 290 is a higher-level cache (for example, an L1 cache) and all lower-level caches (for example, lower-level L2 and L3 caches, not illustrated) are not disposed within the processor 200, but are disposed elsewhere in the system, but are associated with the processor 200. In such a case, the RCA 280 includes a set-associative array of meta-data entries corresponding only to lines of data associated with the L1 cache 290, and all the lower-level caches (not illustrated) which are associated with and disposed external to the processor 200 include an associated respective RCA which includes entries corresponding only to lines of data associated with the respective external lower-level L2 and L3 caches.

The region coherence protocol of the present invention utilizes interconnect hierarchy levels which can be devised for logical groups of processors 200, for example, for processors 200 on the same chip (not illustrated), or aggregated into the same module (not illustrated), or on the same SMP node 10, or on the same printed circuit board (not illustrated), or in the same cabinet, etc., where, for example, the chip level may be at the lowest hierarchical level and the cabinet level may be the highest hierarchical level. Whether there are one or more levels of interconnect hierarchy in the system 5, the operation of the region coherence protocol is essentially the same. The region coherence state bits 250 would be encoded to indicate the state, that is, the level(s) of the interconnect hierarchy at which one or more processors 200 which have cached lines from the requested region of data is/are disposed.

Figure 3:
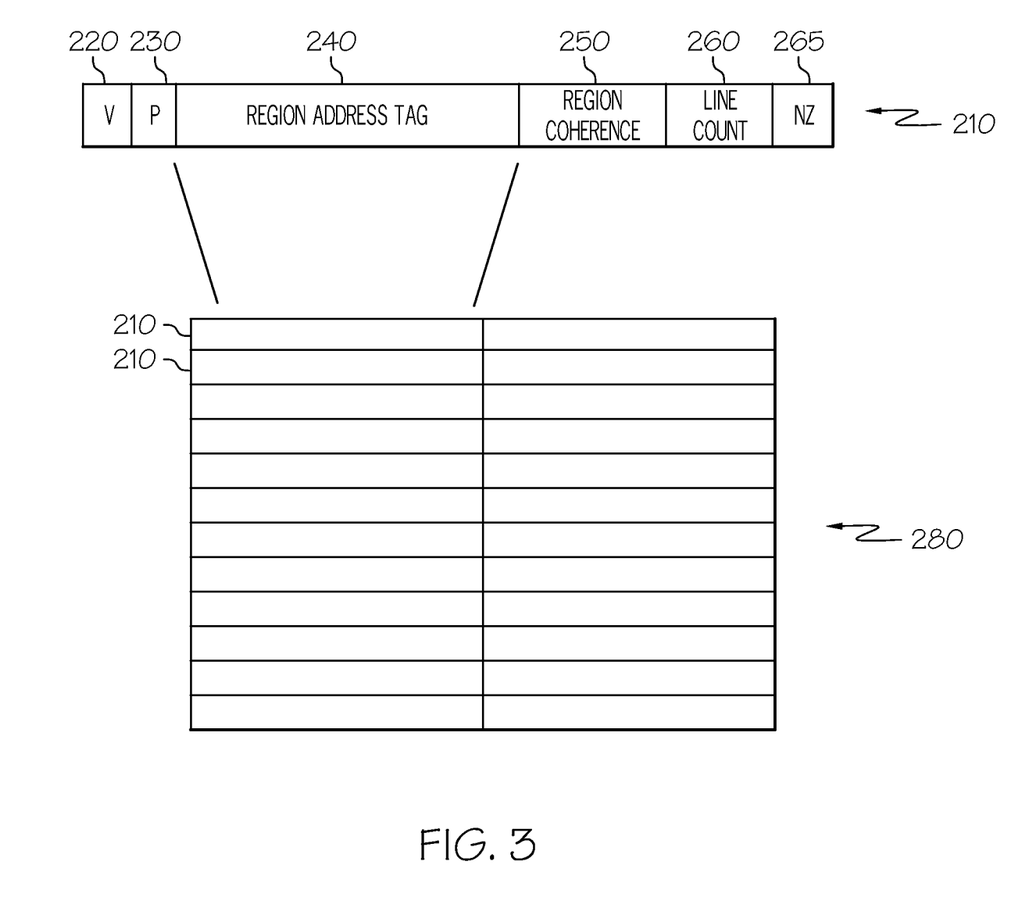
FIG. 3 depicts an embodiment of an entry of a conventional Region Coherence Array.

Referring to FIG. 3, an embodiment of an entry of a conventional RCA 280 is depicted. As illustrated, each RCA 280 includes a plurality of entries 210 each of which may include a valid bit 220, one or more parity bits (or ECC bits) 230, a region address tag 240, a plurality of region coherence state bits 250, a plurality of line-count bits (or presence bits) 260 used to keep track of how many lines (if any) from the region are cached by the processor 200, and a non-zero (NZ) bit 265. For example, there may be six line count bits 260 representing 4 KB regions (32, 128-byte lines). Bits for each entry 210 to implement a least-recently used (LRU) replacement policy are not illustrated, for the purpose of brevity.

Each RCA entry 210 represents a large, aligned region of the system memory 130 that is a power-of-two multiple of the cache line size, and is no larger than a physical page of the system memory 130 (for example, no larger than a minimum physical page size supported by the computer system 5). The region coherence state bits 250 summarize the coherence status of the lines in the region, more specifically, the coherence status of lines in the region in the caches of other processors. The line-count bits 260 summarize whether the processor 200 with which the RCA 280 is associated is caching lines from the region by keeping track of how many lines from the region the processor 200 is caching. The line count bits 260 are also used when responding to requests from other processors 200 to signal that lines are cached from the region around the requested line. The region coherence state bits 250 are used in conjunction with the line-count bits 260 to implement a region coherence protocol, which summarizes the coherence status of the lines in the region, to more efficiently maintain cache coherence of the system 5.

The NZ bit 265, if used, is a bit to indicate a non-zero value of the line-count or presence bits 260 when the NZ bit 265 has a value of "1" and a zero value when it has a value of "0". The NZ bit 265 may be set whenever the line count is incremented or a presence bit is set. The NZ bit 265 may be cleared (set to a value of "0") whenever the line count is decremented to zero, or when the last presence bit is cleared. Use of the NZ bit 265 by the system 5 allows for faster access for external requests, since only the NZ bit 265 needs to be read by an external request without reading the value of the entire line count or presence bits 260 and then comparing that read value to zero to determine whether the line-count or presence bits 260 have a non-zero value.

Entries 210 of the RCA 280 are allocated when lines from a region of memory around the requested line and are brought into the cache hierarchy of the processor 200. On broadcast snoops, requests not only check the caches 290 of other processors 200 for the requested line, but also check the RCAs 280 of the other processors 200 for the region surrounding the requested line. Each processor 200 responds with both the line status and the region status (whether the processor 200 is caching lines from the region), and the line status and region status of the processor 200 are combined with that of other processors 200 to form a combined snoop response (a line snoop response and region snoop response). Based on the region snoop response, the region coherence state bits 250 are updated to reflect whether other processors 200 are caching lines from the same region, and this information is used to optimize the routing of future processor requests for lines in the region.

In the present invention, to improve the precision of CGCT which use RCAs, without sacrificing reach (data mapping), large regions of the system memory 130, which include no more than a physical page of the system memory 130, are divided into smaller subregions to track with greater precision the coherence status of lines in the region. A subregion is a power-of-two fraction of the region size of the system memory 130, may be at least as large as a cache line, and may be address-aligned with respect to the region. Each subregion has its own associated region coherence state and line-count. With the use of subregion coherence state tracking, no separate state or line-count is needed for the region as a whole. If presence bits 260 are used to determine presence of cached lines instead of line-counts to keep track of the number of lines from the region that are cached, then each subregion has its own set of presence bits 260.

To preserve spatial locality in the present invention, entire regions of the system memory 130 are requested at one time, which provides prefetching of the coherence state of subregions that are adjacent to the subregion having the requested line. This differs from conventional sublining, which is typically performed to reduce cache tag overhead, and where sublines are accessed individually. In the present invention, on external memory requests, processors 200 check their respective RCA 280 for the requested region, and if lines from the requested region are present (that is, the region is present), the processors 200 obtain the line-count for each subregion within the region which is present. If the line-count from a subregion is a nonzero value, this indicates that the subregion has lines cached by the processor 200.

A region snoop response is generated for each subregion by, for example, OR-ing snoop responses for that subregion from other processors 200. The region snoop response for the requested subregion may be used, like a conventional region snoop response, to update the coherence state of the requested subregion by the RCA 280 of the requesting processor 200. The region snoop response for the non-requested subregions in the requested region may be used to upgrade the coherence state of those subregions in the RCA 280 of the requesting processor 200 in anticipation of future requests by the processor 200 to these subregions. This method of prefetching the coherence status of the non-requested subregions is referred to as "subregion prefetching". Note that the RCA 280 is a metadata structure, and therefore no data is held by the RCA 280. Thus, subregion prefetching does not involve a data transfer.

Due to the smaller granularity of subregions compared to regions, the tracking of coherence status is more precise. There is less false sharing of subregions than of regions. For example, if two processors 200 are using lines from different subregions within the same region, they may both obtain lines of the system memory 130 without broadcasting, and without a loss of coherence. The combination of a large region size and subregion prefetching ensure that the same amount of spatial locality and temporal locality is exploited. Additional bits are needed in a combined region snoop response to include a response for each subregion.

Figure 3A:
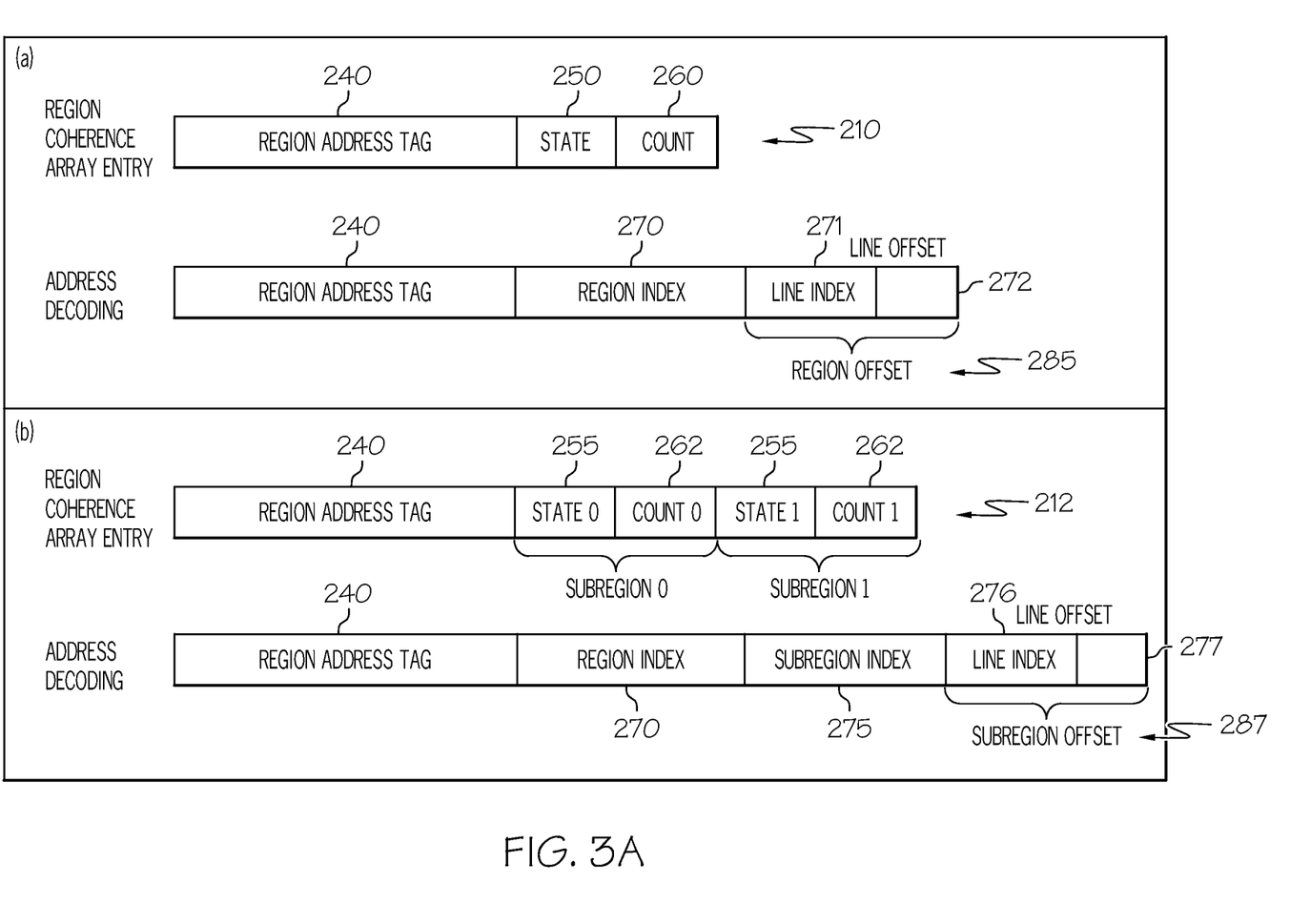
FIG. 3A depicts an embodiment of an entry of a conventional Region Coherence Array, and an embodiment of an entry of a Region Coherence Array which includes subregion information according to the present invention.

FIG. 3A is a block diagram depicting embodiments of RCA entries. Block (a) of FIG. 3A includes an embodiment of an RCA entry 210 for a conventional RCA which includes a region address tag 240, the coherence state as indicated by region coherence bits 250, and a line-count as indicated by line-count bits 260. Address decoding results in the region address tag 240, a region index 270 and a region offset 285 which, since the region includes a power-of-two number of cache lines, includes a cache line index 271 and a cache line offset 272.

Block (b) of FIG. 3A includes an embodiment of an RCA entry 212 for the RCA 280 of the present invention where a region of the system memory 130 is divided into multiple subregions (for example, as illustrated, a subregion 0 and a subregion 1), such that each subregion may be indexed by the high-order bit of the region offset 285, and such that each subregion includes a coherence state and a line-count as indicated, respectively, by each subregion's respective subregion coherence bits 255 and subregion line-count bits 262. The line-count is smaller for the subregion than for the region as a whole because the number of lines in the subregion is, in this example, one-half that of the region. Address decoding results in the region address tag 240, a region index 270, a subregion index 275 and a subregion offset 287 which includes a cache line index 276 and a cache line offset 277. The additional state information provided with use of the subregions is used by the system 5 to track, more precisely than with a conventional RCA, the coherence status of lines in the region.

As described above, each subregion may have its own associated respective line-count value, where the line-count corresponds to the lines from the subregion of the region of the system memory 130 that are cached by the processor 200. Otherwise, if a processor 200 were caching a line from a region and only a single line-count were used for the entire region, it would falsely respond to requests of other processors 200 by indicating that all the subregions are shared (and hence the region would be shared). Thus, by use of a separate line-count for each subregion, a subregion is considered shared only if another processor 200 is caching lines from the same subregion.

If a plurality of presence bits 260 are used to indicate the presence of a requested line of data instead of a line-count, then there is no significant difference between using a single set of presence bits 260 for the entire region or for each subregion within the region. A single presence bit 260 per line may be used for each subregion, and the same number of presence bits 260 is used regardless of whether the presence bits 260 are used to track a line in the entire region or in a subregion of the region. That is, each subregion corresponds to a subset of the total number of presence bits 260 used for the region, and the presence bits 260 can be masked off if all the presence bits 260 are accessed simultaneously.

The following truth tables illustrate possible actions taken by the system 5 of the present invention in response to entries 212 of RCAs 280 of processors 200 of the present invention in regard to a request for a line of data, both by the requesting processor 200, and by the processor 200 receiving the external request. One skilled in the art will recognize that these are examples for a flat, non-clustered multi-processor system, and that they may be easily extended to account for a clustered multi-processor system having a multi-level interconnect. Additional state bits and snoop response bits are added for each level of interconnect hierarchy. In addition, those skilled in the art will recognize that while these examples related to the state of a subregion, or other subregions, that one could have any of power-of-two number of subregions and the following tables would be applicable.

Table 1, illustrated below, depicts the updating of the state for a requested subregion, indicated by the subregion coherence bits 255 of the RCA 280, after a request for a line of data by a processor 200, based on the current subregion state and current subregion snoop response. For the first and second cases shown below in Table 1, a request would not be sent to other processors 200 since the state of the subregion with the requested line in each case has a zero value (that is, no snoop is required—the line may be obtained directly from the system memory 130). Additionally, in the second case, a loss of coherence error will result since the subregion response indicates a value of "1" indicating that another processor 200 has lines from the same subregion as that of the requested line, yet the requesting processor 200 has a zero value in its RCA 280 for the subregion state which indicates a loss of coherence. A subregion state of "0" indicates that no other processor 200 has any lines from that subregion, and preferably the present invention is implemented to maintain this property.

TABLE 1

| Subregion State | Subregion Snoop Response | Next Subregion State |
|---|---|---|
| 0 | 0 | X |
| 0 | 1 | X |
| 1 | 0 | 0 |
| 1 | 1 | 1 |

For tables 2-4 shown below, the next subregion state for the subregion of the requested line is the result of the current subregion coherence bit(s) 255, which indicate the subregion state being ANDed with the subregion response bit(s) for that subregion.

Table 2 below illustrates the updating of an "other subregion state" after a request for a line in another subregion of the same region based on the current state of the other subregion and snoop response of the other subregion. The response to the snoop request in this scenario is indicated by the subregion snoop response bits for the subregion(s) from the region other than the one requested, generated as the result of a subregion prefetch. The case where the next subregion state has a value of "X" indicates a loss of coherence, and is an error. As with the case of the subregion which includes the requested line, the other subregion's next state is the current state bit(s) ANDed with the snoop response bit(s) corresponding to that subregion.

TABLE 2

| Other Subregion State | Other Subregion Snoop Response | Next Subregion State |
|---|---|---|
| 0 | 0 | 0 |
| 0 | 1 | X |
| 1 | 0 | 0 |
| 1 | 1 | 1 |

Referring below to Table 3, an updating of a subregion state after a request by another processor 200 for a line in that subregion. Note that regardless of the current state of the subregion, and the line count, a request from another processor sets the bit in the subregion state. The subregion is now shared. For clustered systems, an external request sets the bit in the subregion state corresponding to the location of the requesting processor 200.

TABLE 3

| Subregion State | Line Count Zero | Next Subregion State |
|---|---|---|
| 0 | 0 | 1 |
| 0 | 1 | 1 |
| 1 | 0 | 1 |
| 1 | 1 | 1 |

Referring below to Table 4, an updating of the "other subregion state" is accomplished after a request from another processor 200, referred to as an "external request". That is, the external request prefetches the state of the other subregion to improve perfomance. With one exception, an external request does not modify the state of the other subregion—if the state was '0' before, it remains '0'. The reason for this is that the request is for a line in a different subregion of the same region, and hence the other subregions do not automatically become shared. An exception to, this is the case where the subregion state is zero, and the line-count is zero, in which case the subregion state is set to "1" after an external request to ensure that no two processors 200 will have a subregion state of "0" for the same subregion, which would indicate a loss of coherence. The first case shown below is different from the similar case shown in Table 3, since because this case exemplifies a subregion prefetch, the subregion state does not change, provided that the line count is non-zero.

TABLE 4

| Other Subregion State | Line Count Zero | Next Subregion State |
|---|---|---|
| 0 | 0 | 0 |
| 0 | 1 | 1 |
| 1 | 0 | 1 |
| 1 | 1 | 1 |

Figure 4:
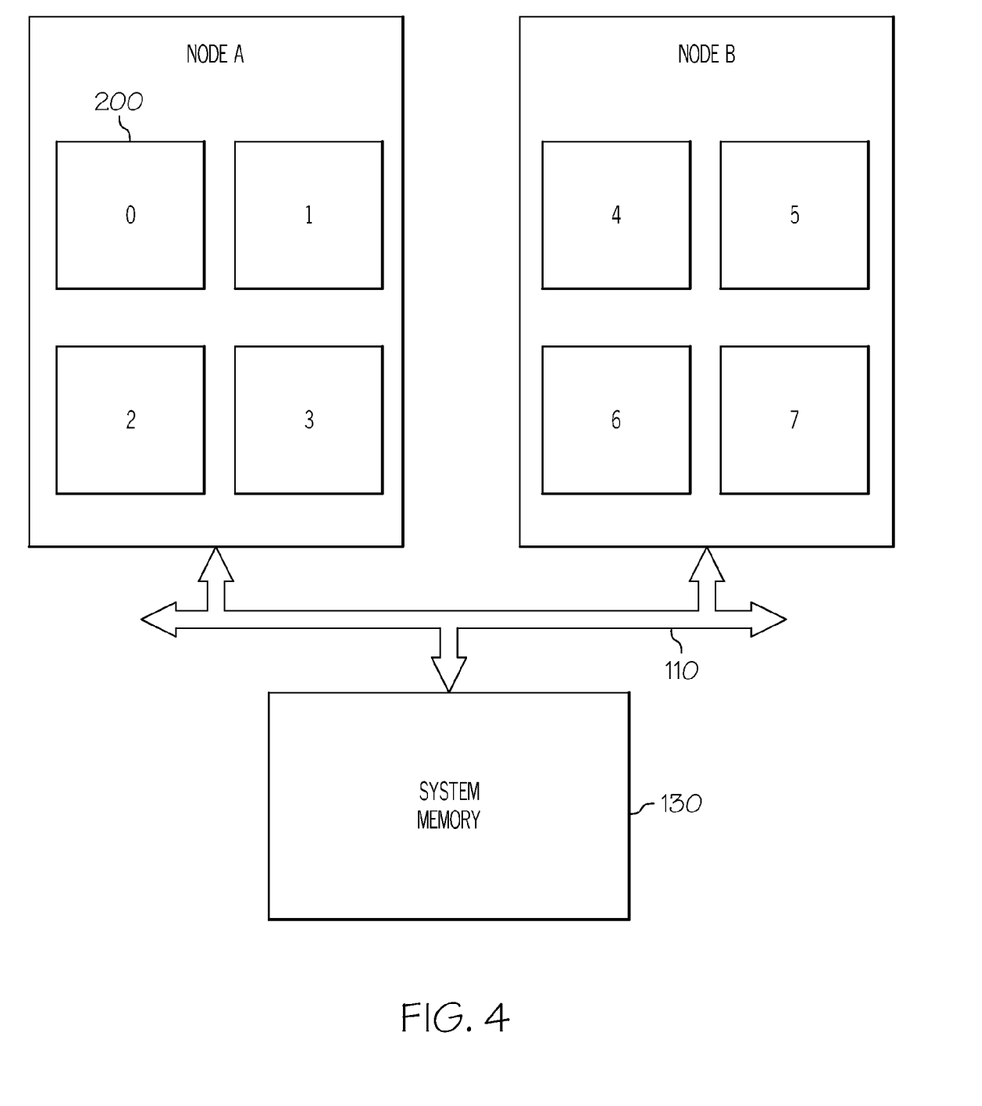
FIG. 4 depicts a plurality of multiprocessor nodes according to an embodiment of the present invention.

Below is described various examples and embodiments of the operation of the subregion scheme of the present invention which uses subregion prefetching. Referring to FIG. 4, for each of the following scenarios, there are SMP nodes A and B, where each SMP node includes four processors 200, labeled 0-3 and 4-7, respectively, for the SMP nodes A and B. SMP nodes A and B are coupled to the system memory 130 via system bus 110, similar to that depicted in FIG. 1 for SMP node 10. Each processor 200 has an RCA 280 which includes for each region, two subregions having four lines of data.

Each processor 200 may access any line capable of being stored in the system memory 130, however if another processor 200 has the requested data in its cache (not illustrated), the requesting processor 200 attempts to obtain the cached copy of the line of data as the cached copy is more likely an up-to-date copy than the copy in the system memory 130. A processor 200 may evict a line of data from its cache without informing other processors 200. If the evicted line of data has not been modified, the line is simply invalidated, otherwise the modified line of data must be written back to the system memory 130.

The five scenarios describe in greater detail example embodiments of the operation of the method of the present invention.

Scenario 1: Processor 0 of SMP node A requests a line of data, and it does not have the corresponding region (that is, it does not have any lines from the corresponding region) in its RCA 280. The request is for a line of data from a subregion 0 of a region X of the system memory 130 of the system 5. The processor 0 allocates an entry for the corresponding region X in its RCA 280 having a line-count of "0" for each of the two subregions (0 and 1) of region X and a region coherence state of all "1's" for each of the two subregions of the region X. The reason for having all "1's" is that processor 0 currently has no information about the region X, and it must assume for safety sake that lines of data of each of the two subregions of region X are being shared by other processors 200 at all levels of the interconnect hierarchy. If not, it is possible that two processors 200 will obtain a modifiable copy of a line of data at the same time, which would indicate a loss of coherence.

Processor 0 then sends a request for a line of data to Node A via a node snoop (node pump). This request goes to processors 1, 2, and 3 of SMP node A, each of which check their respective cache and RCA 280 for the requested line of data, and the requested region X, respectively. The line-counts for both the requested subregion and the other subregion in the requested region X are examined. For each of the two subregions of the region X, there will be a bit in the region snoop response indicating whether other processors disposed on the same SMP node have cached copies of lines from that subregion. If none of the other processors (1, 2 or 3) of SMP node A have the requested line, the line snoop response for SMP node A is set to "0". If none of the other processors (1, 2 or 3) of SMP node A have the region X in their respective RCA 280, the region snoop response is set to "10" for each subregion (that is, because this was not a global snoop, the bit for other nodes defaults to "1", and the bit for the node is "0"). The state for each subregion of region X in the RCA 280 of the requesting processor 0 is updated based on the region snoop response bits, by ANDing the region snoop response bits (being "10" for each subregion) with the subregion coherence state bits 255 (being "11" for each subregion). The region coherence state is now "10" for each of the two subregions, since SMP node B may have cached copies of lines of data from one or both of the subregions, but it is not possible to tell whether SMP node B has cached lines of one or both of the subregions until communication is made with SMP node B.

Processor 0 then sends a global snoop, which goes to all processors (0-7) in SMP nodes A and B. It is possible to check only the processors (4-7) in SMP node B, having first done a node-pump of SMP node A, but in general, it is easier to send a global snoop to SMP nodes A and B. The global snoop is used since the node snoop has failed to find a cached copy of the requested line in SMP node A, and cached copies of lines from the region may exist elsewhere in the system 5. Assume for this example that processor 7 has the requested line of data in its cache. The line snoop response is therefore a "1", and the region snoop response for the requested subregion is therefore "10". Assuming that no processors have cached any lines from subregion 1 of the requested region X, the region snoop response for subregion 1 is therefore "00". The subregion coherence state bits 255 of subregion 0 of region X for processor 0 of SMP node A are bitwise ANDed with the value from the snoop response for subregion 0, and processor 0's subregion coherence state bits 255 for subregion 1 are bitwise ANDed with the value from the snoop response for subregion 1. The resulting region coherence states for subregions 0 and 1 are "10" and "00", respectively. Processor 7 will send the requested line to processor 0, and because the line snoop response was "1", the system memory 130 will not be accessed for the line of data.

When processor 7 of SMP node B receives the request from processor 0, it can determine that there will be a cached copy of the requested line of data on another node (SMP node A). Therefore, if the region coherence state for subregion 0 for processor 7 was "00" because it had the only cached copies of lines from the region X in the system 5, it now sets the region coherence state bit for other nodes. The region coherence state for processor 7, subregion 0 is now "10". In this example, processors 0 and 7 both have copies of the same line of data, and the same region coherence state. Processors 0 and 7 each have a state of "10" for subregion 0. Processor 1 upgrades its state for subregion 1 from "11" to "00", having prefetched the status of subregion 1. In addition, processor 7 downgrades its state for subregion 1 from "00" to "10" since its line count was "0", which ensures that both processors 0 and 7 do not both possess lines of subregion 1 and have a state of "0", which could lead to a loss of coherence for the system 5.

Therefore, processor 0 and 7 now have a state "10" for subregion 0 of the requested region X. If there are subsequent requests for lines of data of that subregion 0, a global snoop will be performed right away to determine whether cached copies of the requested line exist. Also, processor 0 now can determine that no processors have any cached copies of lines from subregion 1, because it has a state "00". If processor 0 makes a request for a line of data in subregion 1, that request can go directly to the system memory 130.

Scenario 2: Assume from Scenario 1 above that processors 0 and 7 have cached copies of a line of data from subregion 0 of region X, and that both have a region coherence state '10' for the subregion 0. Processor 1 of SMP node A now requests that line of data by sending out a node snoop for the line. There is a copy of the line in processor 0's cache, so processor 0 downgrades its coherence state for subregion 0 to '11', indicating that there are cached copies of the line on SMP node A and on other nodes (that is, for example, on SMP node B). Processor 1, which starts with state '11' for both subregions from the allocation of the region X, has the same coherence state for subregion 0, where the region snoop response to the node snoop is "11". However, the node snoop also prefetches the state of subregion 1 from processor 0, downgrading processor 0's state for subregion 1 to '01', and returning a response of "10" for subregion 1. Again, the response bit for other nodes defaults to "1" since this is a node snoop operation. In this case, processors 0 and 1 have a state of '11' and processor 7 has a state of '10', for subregion 0. Processors 0, 1, and 7 have states of '01', '00', and '10' for subregion 1, respectively (where processor 1 has exclusive access to the subregion, although no processor is caching any lines from the subregion).

Scenario 3: Assume from Scenario 2 above that processors 0, 1, and 7 have cached copies of a requested line of data, and having region coherence states of '11', '11' and '10' for the subregion 0, respectively. Assume that processor 7 needs to evict the cache line to make room for other data. Processor 7 evicts the cache line and its coherence state for subregion 0 and subregion 1 remains unchanged, however its line-count for subregion 0 is decremented to "0" due to the eviction of the last line of data from the subregion. The region coherence state does not change on an eviction of a line of data because the region coherence state only encodes information about other processors accessing the region. If the line has been modified by processor 7, it is written back to the system memory 130. In any case, processors 0 and 1 do not have information to determine that processor 7 has evicted the requested cache line or has decremented its line count, therefore their region coherence states remain unchanged.

Scenario 4: Assume from the above scenarios that processors 0 and 1 have cached copies of a requested line of data, and processors 0, 1, and 7 have the respective region coherence states of '11', '11', and '10' for the subregion 0 of region X. Assuming that processor 1 needs to acquire a line of data from subregion 1, and that processor 1 has region a coherence state of '00' for subregion 1. Thus, processor 1 may obtain a copy of the requested line without a snoop, by sending a request for the line of data directly to the system memory 130. The line-count for subregion 1 is incremented by 1, and the state of the subregion 1 in processors 0 and 7 does not change since they have no information regarding the request for the line of data from processor 1. This is because processor 1 had exclusive access to subregion 1 (indicated by a state of all "0's"). Processor 1 has benefited from subregion prefetching, by avoiding a broadcast snoop for the first request for a line of data from the subregion.

Scenario 5: Assume that processors 0 and 1 have cached lines of data from a subregion 0 and have region coherence states of '11' and '01', respectively. Assume also that processor 0 requests a line of data from subregion 1, where there is a state of '01' in processor 0's RCA 280 and a state of '00' in processor 1's RCA 280. Processor 0 has a state of '01' for subregion 1 (indicating lines from the subregion are cached by processors 1, 2 and/or 3 on the same SMP node A, but not on SMP node B). Processor 0 performs a node snoop, and does not find the requested line of data. However, processor 0's request downgrades processor 1's subregion state to '01', since now processor 0 on the same SMP node A will have cached copies of lines from subregion 1. The state of the other subregion (that is, subregion 0) in processor 1 remains unchanged since processor 1 has a line of data cached from subregion 0 and thus, has a non-zero line-count. The node pump fails to find the requested data, however the subregion state in processor 0's RCA 280 indicates a global snoop is unnecessary, and so the line request is sent to the system memory 130. Processor 0 then obtains the line of data from the system memory 130 and increments its line-count for subregion 1.

It is understood that the use herein of specific names are for example only and not meant to imply any limitations on the invention. The invention may thus be implemented with different nomenclature/terminology and associated functionality utilized to describe the above devices/utility, etc., without limitation. While the present invention has been particularly shown and described with reference to a preferred embodiment, it will be understood by those skilled in the art that various changes in form and detail may be made therein without departing from the spirit and scope of the invention. Furthermore, as utilized in the specification and the appended claims, the term "computer" or "system" or "computer system" or "computing device" includes any data processing system including, but not limited to, personal computers, servers, workstations, network computers, main frame computers, routers, switches, personal digital assistants (PDAs), telephones, and any other system capable of processing, transmitting, receiving, capturing, and/or storing data.

It should be understood that at least some aspects and utilities of the present invention may alternatively be implemented in a computer-storage medium that contains a program product. That is, the present invention can also be embodied as programs defining functions in the present invention as computer-readable codes on a computer-readable medium. The computer-storage medium may be a computer-readable medium, which can include a computer-readable recording medium and/or a computer-readable transmission medium, and/or a computer-readable/writeable recording medium. The computer-readable recording medium is any data storage device that can store data which can be thereafter read by a computer system. Examples of a computer-readable recording medium include read-only memory (ROM), and examples of a computer-readable/writeable recording medium include random-access memory (RAM), CD-ROMs, magnetic tapes, floppy disks, hard disk drives, memory stick devices, and optical data storage devices.

The computer-readable recording medium may be distributed over network coupled computer systems so that the computer-readable code is stored and executed in a distributed fashion. The computer-readable transmission medium can transmit data via a wired or wireless configuration (e.g., wired or wireless data transmission through the Internet). Also, functional programs, codes, and code segments to accomplish the present invention can be easily construed by programmers skilled in the art to which the present invention pertains. Further, it is understood that the present invention may be implemented as a system having means in the form of hardware, software, or a combination of software and hardware as described herein, or their equivalents.

What is claimed is:

1. A method of controlling region coherence in a shared-memory multiprocessor system, the method comprising:
 a processor in the shared-memory multiprocessor system generating a request for a line of data storable in a first subregion of a region of system memory, wherein a subregion is a smaller division of the region of system memory that is at least as large as the line of data;
 determining, from a first entry in a region coherence array (RCA), a current region coherence state of the first subregion which indicates whether at least one other processor in the shared-memory multiprocessor system has cached at least one line of data of the first subregion, wherein the RCA is a meta-data array located in a cache hierarchy and is accessed in parallel with a lowest-level cache in the cache hierarchy;
 in response to determining the current region coherence state of the first subregion, updating the RCA associated with the requesting processor; and
 creating a combined snoop response based on a snoop response of the processor and a snoop response for each of the at least one other processor, wherein the snoop response of the processor comprises a status of the line of data and a status of the first subregion in the processor, and wherein the snoop response for each of the at least one other processor comprises a status of the line of data and a status of the first subregion in the at least one other processor.

2. The method of claim 1, further comprising:
 prefetching a current region coherence state of a second subregion adjacent to the first subregion in the system memory;

generating a region snoop response for the first and second subregions; and updating the current region coherence state of the second subregion based on the region snoop response;

wherein each subregion has its own associated line count value corresponding to only the lines of the subregion that are cached by the processor.

3. The method of claim 1, the updating the RCA further comprising:

setting at least one subregion coherence bit within the first entry in the RCA to indicate that at least one other processor in the shared-memory multiprocessor system has cached the at least one line of data of the first subregion.

4. The method of claim 1, the determining of the current region coherence state of the first subregion further comprising:

determining a next subregion coherence state by ANDing the current region coherence state of the first subregion with one or more subregion snoop response bits associated with the first subregion.

5. The method of claim 1, wherein an entry in the RCA further comprises:

one or more state bits for each level of an interconnect hierarchy of the shared-memory multiprocessor system; and one or more snoop response bits for each level of an interconnect hierarchy of the shared-memory multiprocessor system.

6. The method of claim 1, further comprising:

receiving a broadcast snoop of the line of data wherein the snoop response is issued in response to the broadcast snoop of the line of data; and updating the current region coherence state of the first subregion in the RCA associated with the requesting processor based on the combined region snoop response.

7. The method of claim 1, wherein:

a plurality of presence bits of the region of system memory are used to determine the presence of the at least one line of data of the first subregion of the region of system memory;

a subregion of the region of system memory is a power-of-two fraction of a size of the region of the system memory;

each subregion of the region of system memory corresponds to a particular subset at least one presence bit of the plurality of presence bits.

8. A subregion coherence protocol control system, comprising:

a system memory;

a clustered shared-memory multiprocessor system, including:

a region coherence array (RCA) associated with each processor in the clustered shared-memory multiprocessor system;

a logic executing on a processor in the clustered shared-memory multiprocessor system that:

generates a request for a line of data storable in a first subregion of a region of system memory, wherein a subregion is a smaller division of the region of system memory that is at least as large as the line of data;

determines, from a first entry in a region coherence array (RCA), a current region coherence state of the first subregion which indicates whether at least one other processor in the clustered shared-memory multiprocessor system has cached at least one line of data of the first subregion, wherein the RCA is a meta-data array located in a cache hierarchy and is accessed in parallel with a lowest-level cache in the cache hierarchy;

in response to determining the current region coherence state of the first subregion, updates the RCA associated with the requesting processor; and creates a combined snoop response based on a snoop response of the processor and a snoop response for each of the at least one other processor, wherein the snoop response of the processor comprises a status of the line of data and a status of the first subregion in the processor, and wherein the snoop response for each of the at least one other processor comprises a status of the line of data and a status of the first subregion in the at least one other processor.

9. The subregion coherence protocol control system of claim 8, the logic executing on the clustered-shared multiprocessor system further comprising logic that:

prefetches a current region coherence state of a second subregion adjacent to the first subregion in the system memory is prefetched by the system;

generates a region snoop response for the first and second subregions; and updates the current region coherence state of the second subregion based on the region snoop response;

wherein each subregion has its own associated line count value corresponding to only the lines of the subregion that are cached by the processor.

10. The subregion coherence protocol control system of claim 8, the logic for updating the RCA further comprising logic that:

sets at least one subregion coherence bit within the first entry of the RCA to indicate at least one other processor in the clustered shared-memory multiprocessor system has cached at least one line of data of the first subregion.

11. The subregion coherence protocol control system of claim 8, the logic for updating the RCA further comprising logic that:

determines a next subregion coherence state by ANDing the current region coherence state of the first subregion with one or more subregion snoop response bits associated with the first subregion.

12. The subregion coherence protocol control system of claim 8, wherein an entry in the RCA further comprises:

one or more state bits for each level of an interconnect hierarchy of the shared-memory multiprocessor system; and one or more snoop response bits for each level of an interconnect hierarchy of the shared-memory multiprocessor system.

13. The subregion coherence protocol control system of claim 8, the logic executing on the clustered-shared multiprocessor system further comprising logic that:

receives a broadcast snoop of the line of data wherein the snoop response is issued in response to the broadcast snoop of the line of data; and updates the current region coherence state of the first subregion in the RCA associated with the requesting processor based on the combined region snoop response.

14. The subregion coherence protocol control system of claim 8, wherein:

a plurality of presence bits of the region of system memory are used to determine the presence of the at least one line of data of the first subregion of the region of system memory;

a subregion of the region of system memory is a power-of-two fraction of a size of the region of the system memory;

each subregion of the region of system memory corresponds to a particular subset at least one presence bit of the plurality of presence bits.

15. A computer program product, comprising:

a computer-readable recording medium; and program code embodied in said computer-readable recording medium that when executed by a processor of a multiprocessor computer enables the computer to perform the functions of:

generating a request for a line of data storable in a first subregion of a region of system memory, wherein a subregion is a smaller division of the region of system memory that is at least as large as the line of data;

determining, from a first entry in a region coherence array (RCA), a current region coherence state of the first subregion which indicates whether at least one other processor in the multiprocessor computer has cached at least one line of data of the first subregion, wherein the RCA is a meta-data array located in a cache hierarchy and is accessed in parallel with a lowest-level cache in the cache hierarchy;

in response to determining the current region coherence state of the first subregion, updating the RCA associated with the requesting processor; and creating a combined snoop response based on a snoop response of the processor and a snoop response for each of the at least one other processor, wherein the snoop response of the processor comprises a status of the line of data and a status of the first subregion in the processor, and wherein the snoop response for each of the at least one other processor comprises a status of the line of data and a status of the first subregion in the at least one other processor;

wherein an entry in the RCA further comprises: one or more state bits for each level of an interconnect hierarchy of the shared-memory multiprocessor system, and one or more snoop response bits for each level of an interconnect hierarchy of the shared-memory multiprocessor system.

16. The computer program product of claim 15, the program code further comprising additional program code that enables the multiprocessor computer to perform the functions of:

prefetching a current region coherence state of a second subregion adjacent to the first subregion in the system memory;

generating a region snoop response for the first and second subregions; and updating the current region coherence state of the second subregion based on the region snoop response;

wherein each subregion has its own associated line count value corresponding to only the lines of the subregion that are cached by the processor.

17. The computer program product of claim 15, the program code function for updating the RCA further comprises additional program code that enables the multiprocessor computer to perform the functions of:

setting at least one subregion coherence bit within the first entry in the RCA to indicate at least one other processor in the multiprocessor computer has cached at least one line of data of the first subregion.

18. The computer program product of claim 15, the program code function for updating the RCA further comprises additional program code that enables the multiprocessor computer to perform the functions of:

determining a next subregion coherence state by ANDing the current region coherence state of the first subregion with one or more subregion snoop response bits associated with the first subregion.

19. The computer program product of claim 15, the program code further comprising additional program code that enables the multiprocessor computer to perform the functions of:

receiving a broadcast snoop of the line of data, the snoop response is issued in response to the broadcast snoop of the line of data; and updating the current region coherence state of the first subregion in the RCA associated with the requesting processor based on the combined region snoop response.

20. The computer program product of claim 15, wherein:

a plurality of presence bits of the region of system memory are used to determine the presence of the at least one line of data of the first subregion of the region of system memory;

a subregion of the region of system memory is a power-of-two fraction of a size of the region of the system memory;

each subregion of the region of system memory corresponds to a particular subset at least one presence bit of the plurality of presence bits.

* * * * *